Patented June 6, 1950

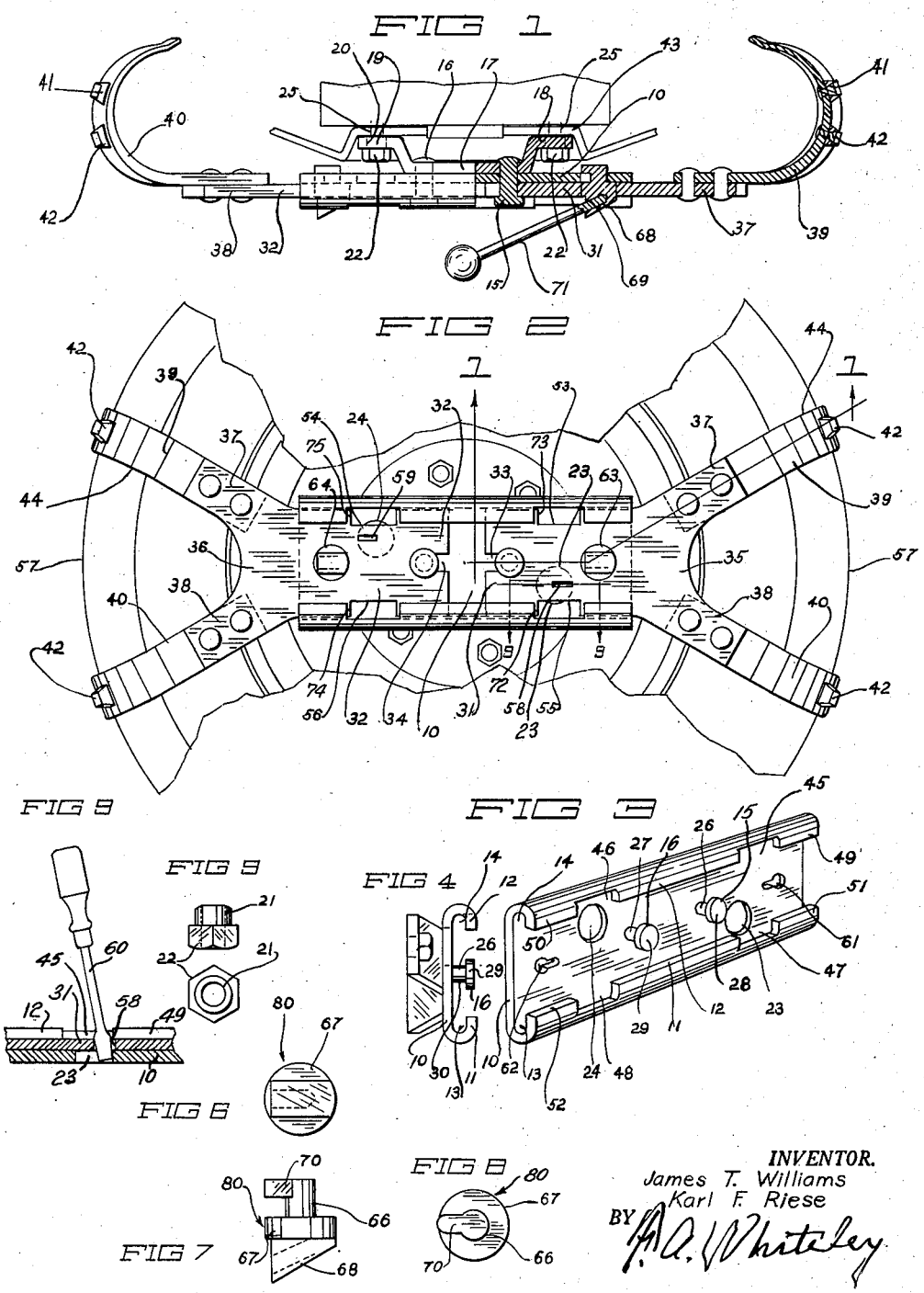

2,510,450

UNITED STATES PATENT OFFICE 2,510,450

ANTISLIPPING DEVICE FOR AUTOMOBILE TIRES

James T. Williams, Minneapolis, and Karl F. Riese, St. Paul, Minn.

Application April 25, 1946, Serial No. 664,853

4 Claims. (Cl. 301—44)

Our invention relates to an anti-slipping device for automobile tires, and has for its object to provide, in combination with the hub of an automobile wheel and selected lugs for securing the wheel thereto, removably attached members which have lug carrying parts gripping the outer face of the tire on opposite sides thereof.

As is well known, in regions where there is snow and ice and also where there is mud on the roads or highways, it has been customary to apply to the outer circumferential limits of automobile tires some form of device which provides lugs or protruding parts enabling the wheel to get traction effect on such snowy or icy or muddy surfaces as may be encountered on any particular highway.

The commonest form of such devices are what is known as tire chains. These chains comprise a pair of parallel chain members adapted to be positioned on each side of the tire with transverse chain sections which will overlie the outer face of the tire. This entire assemblage is applied to the tire and the parallel chains are in various ways secured together and the arrangement gives a series of transverse chain links forming projections from the outer face of the tire.

A great difficulty has been encountered in connection with the use of tire chains or similar devices heretofore employed for the same purpose. This difficulty comes from the fact that the chains or traction projections are not to be employed unless the road conditions require it. Hence they have to be frequently applied and removed. The making of this application and removal, particularly applying the chains, is a matter which presents a very considerable problem and substantially always possible extreme labor and discomfort on the part of the driver or operator of the car.

We have discovered that by using a substitute for the hub cap, bolted to the wheel and a specially constructed frame member adapted to be removably attached thereto, a very simple arrangement of members overlying the faces of the tire may be provided which can be attached and detached with the utmost simplicity and ease.

We have further discovered that by securing to the wheel in the place of the hub cap a longitudinal frame member with a way formed of turned-over flanges, a pair of members may be introduced in the way at opposite sides thereof, said members having an open loop overlying the outer face of the tire, and by simple means the loop may be forced firmly in engagement with the tire body and locked in that position, said loop carrying lugs which engage the surface over which the wheel is driven and continually effect the necessary traction grip to move the vehicle.

We further discovered that the members above noted, which are attached on opposite sides of the holding member, may be in the form of a fork so that two lug-carrying loops overlie opposite sides of the face of the tire to provide the necessary traction on ice, snow or mud to move the vehicle over such surfaces when the wheel is being driven.

It is a principal object of our invention, therefore, to provide traction means for automobile tires, wherein a frame member is secured to the wheel hub in the place of the normal hub cap, said frame member providing oppositely extending open-ended ways, and to apply to said ways traction members having lug-carrying loops overlying the opposite sides of the tire face.

It is a further object of our invention to form the lug-carrying loop members in the form of forks so that separated sets of lugs may be in the manner of our invention attached to overlie opposite sides of the outer face of the tire.

It is a further object of our invention to provide means whereby the slide members connected with the lug-holding loops may be forced into position so said loops grip the pneumatic tires with some degree of force, together with means for locking them in such gripping position.

The full objects and advantages of our invention will appear in connection with the details of construction recited in the following specification, and the novel features of our invention by which the aforesaid advantageous results are secured will be particularly pointed out in the claims.

In the drawings illustrating an application of our invention in one of its forms:

Fig. 1 is a part sectional transverse view of the invention, the sectional part being on line 1—1 of Fig. 2.

Fig. 2 is a side elevation plan view of the invention as it appears on an automobile wheel.

Fig. 3 is a perspective plan view of the frame piece taken from the exposed front side thereof.

Fig. 4 is an end elevation of the frame piece and supporting parts therefor in position on the wheel hub without any lug-holding strips in the guideways.

Fig. 5 is an elevation and plan view of a sleeve nut for attaching the frame member to the wheel hub.

Fig. 6 is a plan view of a special locking member.

Fig. 7 is an elevation view of the same.

Fig. 8 is a plan view of the key fastening device shown from the opposite end of Fig. 6.

Fig. 9 is a section on line 9—9 of Fig. 2, showing the screw driver in position as the parts are pried together.

As illustrated, a frame plate 10 has its edges turned over as indicated at 11 and 12, Figs. 3 and 4, to provide grooves 13 and 14 at the sides of the plate. As best shown in Fig. 1, the plate 10 has secured thereto by studs 15 and 16 a bracket member 17 provided with offset feet 18 and 19. These feet are provided with enlarged openings 20 which receive the annular shank 21 of a special nut member 22 positioned to come opposite the respective holes 23 and 24 in the plate 10, as shown in full lines in Fig. 3, and in dotted lines in Fig. 2.

The nuts 22 are internally threaded and are adapted to be screwed upon the customarily threaded studs fast on the wheel hub for holding the wheel upon the hub. To screw the frame plate 10 upon the wheel, therefore, it is only necessary to remove the customary hub cap and through the openings 23 and 24 to screw the special nuts 22 upon the customary threaded lugs indicated in dotted lines at 25 on the hub of the wheel. In that manner the plate 10 is firmly supported upon the wheel hub and yet so it may readily be removed and the hub cap restored in position.

The studs 15 and 16 which secure the bracket member 17 to the plate 10 have their shanks 26 and 27, Figs. 3 and 4, extending outwardly a sufficient distance and are provided with circular heads 28 and 29. The inner sides of these heads are spaced from the upper surface of plate 10, as indicated at 30 in Fig. 4.

These spaces are adapted to receive with a reasonably close fit the body of plates 31 and 32 about slots 33 and 34 formed in the central ends of plates 31 and 32, as best shown in Fig. 2.

These plates have extensions 35 and 36 which in turn are each provided with fork arms 37 and 38, Figs. 1 and 2, which extend outwardly at quite broad angles to each other, as clearly shown. To the respective arms 37 and 38 are secured by riveting or other suitable means, a pair of half loop members 39 and 40. The half loop members 39 and 40 are each provided with pairs of central but transversely positioned lug members 41 and 42, which will come at the outside of the tire rim and will be spaced on opposite sides thereof, about one-eighth of the tire circumference apart.

The bracket member 17, in conjunction with the feet 18 and 19, hold the plates 31 and 32 spaced from the wheel hub 43 so as to bring the plates 37 and 38 and the adjacent parts of members 39 and 40 substantially into the plane of the outer side limits of the tire, as indicated at 44 in Fig. 2.

For easy assembly of these lug-carrying loop members 35 and 36, the flange 12 is provided with cut-out slot-like portions 45 and 46, and the flange 11 has similar cut-out portions or slots 47 and 48. This leaves end pieces 49 and 50 on flange 12 and end pieces 51 and 52 on flange 11.

Correspondingly, the plates 31 and 32 have cut-out portions 53 and 54 on one side and 55 and 56 on the other side corresponding to the cut-out portions 45, 46 and 47, 48 in the flanges heretofore described, which leaves on plates 31 and 32 separated end portions 72, 73 and 74, 75 respectively constructed and arranged in position and length relative to the notches or slots 45, 47 and 46, 48 and end portions 49, 50 and 51, 52 of the flanges 11 and 12, respectively, to permit ready assembly.

In assembling, therefore, the end portions 72 and 73 on plate 31 will be passed through flange slots 45 and 47 and the end portions 49 and 51 of the flanges 11 and 12 will be passed through slots 53 and 55 in plate 31, where the bulge in the side of the tire can not prevent positioning the plates for ready sliding in the ways formed by flanges 11 and 12 and slots 13 and 14.

In the same manner plate 32 will be put into position by having its end extensions 74 and 75 pass through the flange slots 46 and 48, and correspondingly the flange extensions 50 and 52 will be passed through the slots 54 and 56 in plate 32. These plates are then pushed forward until the slots 33 and 34 in their ends encircle the studs 26 and 27 under the stud heads 28 and 29.

But to get a firm grip of the loops 39 and 40 on the outer walls of the tire 57, force must be applied to compress the tire under the loop members 39 and 40. A pair of rectangular openings 58 and 59 through plates 31 and 32, respectively, are provided which are adapted to receive a screw driver 60, see Fig. 9. The end of the screw driver engages the wall of opening 23 (or 24) when the plate 31 is pushed into position and the end of the screw driver engages the walls of the opening 24 when the plate 32 is being pushed into operative position. The showing of Fig. 9 indicates that the screwdriver has been swung to the left, engaging with its lower end the wall of hole 23 and forcing plate 31 to the left and the arms 39 and 40 into tire compressing engagement with the outer wall 57 of the tire.

The plate 10 is provided at one end with a keyhole-shaped slot 61 and at the other end with a keyhole-shaped slot 62, said slots being in alignment longitudinally along the center of plate 10. The plate 31 has a round opening 63 adapted to come above the keyhole slot 61. Likewise, the plate 32 has a round opening 64 which comes over the keyhole slot 62.

A special locking member 80 is shown in Figs. 6, 7 and 8. This includes a cylindrical shank 66, a circular head 67 connected therewith, an outwardly extending lug 68 provided with a threaded socket 69, Fig. 1, and an end portion 70 of the lug 66 which has a keyhole-shaped plan configuration similar to the keyhole openings 61 and 62, but small enough to go through them, see Figs. 1, 7 and 9.

When one of the plates, as for example 31, has been brought into tire-compressing position, the fastening member above described is pushed through the hole 63 and the keyhole-shaped extension 70 is pushed through the keyhole 61 and then by means of an arm 71 threaded into the threaded opening 69 the fastening member is turned to bring the extension from the shaft portion 66 of the fastening member under plate 10 and thus lock plate 31 and the parts carried thereby into position where the loops 39 and 40 are firmly engaged with the outer surface of the tire 57. The lug-carrying loops connected with the plate 32 are in similar manner, using the screw driver slot 59, the opening 24 and one of the locking members 80, going through opening 64 and 62, secured in position to have its loop members 39 and 40 firmly engaged upon the outer surface of tire 57.

The advantages of our invention will have been quite clearly presented in the description of the structure and arrangement and mode of use of the invention given in the foregoing specification. The fundamental advantage resides, of course, in the ease and simplicity of attaching and detaching the lug-carrying loops in firm contact with the outer perimeter of the tire, whereby all necessary traction means quite well balanced is provided for moving the vehicle over any kind of icy, wet or muddy road surface.

A great advantage in connection with applying these traction members resides in the fact that it is done on the side of the wheel at the center level of the hub where it is easy to reach and make the necessary manipulations to effect the application. Because of this the tire chain substitute may be applied in the midst of deep mud or deep snow which can never be done with ordinary tire chains.

Still another advantage resides in the simple manner in which the lug-holding loops are brought forcibly and compressingly into engagement with the outer wall of the tire and are easily and effectively locked in that position.

We claim:

1. An anti-slipping device for automobile tires, comprising a frame plate formed with a longitudinal open-ended way, threaded studs on the wheel hub and nuts therefor and feet on the frame for removably securing the frame to the wheel hub in lieu of the hub cap, a slide removably mounted in the way having a half loop positioned to overlie and to engage the outer face of the tire, means including an opening in the frame plate and a slit in the slide for reception of a tool whereby the half loop is forced into compressing position against the outer face of the tire, means for locking the slide in such compressing position, and lugs on the half loop extending radially outwardly from the face of the tire.

2. An anti-slipping device for automobile tires, comprising a frame plate formed with a longitudinal open-ended way, threaded studs on the wheel hub and nuts therefor and feet on the frame for removably securing the frame to the wheel hub in lieu of the hub cap, a pair of slides removably mounted end to end in the way having diverging arms each carrying a half loop positioned to overlie and to engage over the outer face of the tire, means including openings in the frame plate and a slit in each of the slides for reception of a tool whereby the half loops on the respective diverging arms of each slide are each forced into compressing position against the face of the tire, means for locking each of the slides with the half loops in such compressing position, and lugs on each of the half loops extending radially outwardly from the face of the tire.

3. An anti-slipping device for automobile tires, comprising a longitudinally extended plate forming a frame, inwardly turned flanges at the edges of said plate producing opposed open slots which together with the inside of the plate form an open-ended way, threaded studs on the wheel hub and nuts therefor and feet on the frame for removably securing the frame to the wheel hub in lieu of the hub cap, a slide consisting of a plate having its edges underlying the flanges in the flange slots to move along the way and having a half loop positioned to overlie and to engage over the outer face of the tire, means including an opening in the frame plate and a slit in the slide for reception of a tool whereby the half loop is forced into compressing position against the outer face of the tire, means for locking the slide in such compressing position, and lugs on the half loop extending radially outwardly on the face of the tire.

4. An anti-slipping device for automobile tires, comprising a longitudinally extended plate forming a frame, inwardly turned flanges at the edges of said plate producing opposed open slots which together with the inside of the plate form an open-ended way, threaded studs on the wheel hub and nuts therefor and feet on the frame for removably securing the frame to the wheel hub in lieu of the hub cap, said flanges having portions cut out of fixed dimensions leaving at their ends correspondingly sized uncut-out portions, a slide consisting of a plate having cut-out portions at its edges corresponding in size and relative position with the cut-out portions of the flanges, said slide having its edges positioned in the slots and adapted to be moved freely longitudinally and to be readily introduced in and removed from the way by cooperation of the respective cut-out portions in the flanges and in the slide, said slide having a half loop adapted to engage over the outer face of the tire, means including an opening in the frame plate and a slit in the slide for reception of a tool whereby the half loop may be forced into compressing position against the outer face of the tire, means for locking the slide in such compressing position, and lugs on the half loop extending radially outwardly on the face of the tire.

JAMES T. WILLIAMS.
KARL F. RIESE.

REFERENCES CITED

The following references are of record in the file of this patent:

UNITED STATES PATENTS

| Number | Name | Date |
| --- | --- | --- |
| 1,540,470 | Hayden | June 2, 1925 |
| 2,169,950 | Hamalainen | Aug. 15, 1939 |
| 2,174,345 | Worthing | Sept. 26, 1939 |

FOREIGN PATENTS

| Number | Country | Date |
| --- | --- | --- |
| 476,444 | Great Britain | Dec. 9, 1937 |